Jan. 28, 1964  H. P. DEBART  3,119,967
SEPARATION OF ELECTRIC SIGNALS
Filed May 16, 1958

INVENTOR
HUBERT PAUL DEBART
BY
ATTORNEYS

United States Patent Office 3,119,967
Patented Jan. 28, 1964

3,119,967
SEPARATION OF ELECTRIC SIGNALS
Hubert Paul Debart, Paris, France, assignor to Societe Alsacienne de Constructions Mechaniques, Paris, France, a corporation of France
Filed May 16, 1958, Ser. No. 735,816
7 Claims. (Cl. 325—323)

The present invention relates to the separation of electric signals and more particularly to the separation of a short signal, such as a sinusoidal radar signal from a continuous or periodic jamming signal.

By the term "short signal" used throughout the present specification and claims is meant a signal having a duration which is short compared with the duration of propagation of an impulse on the line.

Various means are presently known for jamming radar signals with a view to make more difficult or even impossible the interception and fixing of obstacles and targets by means of electro-magnetic waves. Such a jamming signal may for instance be obtained by means of a backward wave oscillator known as a carcinotron which is a micro-wave self oscillator capable of covering a frequency band of one octave. Such a tube includes a delay line having a negative group velocity which is constant within a wave length interval of the order of one octave. It is known that for a single-frequency signal propagated in a lossless but dispersive medium, the group velocity $v_g$ equals the derivative of the angular frequency $\omega$ with respect to the phase shift $\beta$ per unit of length, where $\omega$ equals $2\pi$ times the frequency.

$$v_g = \frac{d\omega}{d\beta}$$

The group velocity corresponds to the energy propagation velocity and consequently to the propagation velocity of the front of a sine wave signal of a finite duration in a dispersive medium. An observer placed in such a lossless but dispersive medium would first perceive low amplitude oscillations or "precursory signals," then the signal front proper.

The group velocity may be positive or negative whereas the phase velocity $v_p$, which is the velocity of propagation of the phase of a single-frequency signal in a lossless medium is always positive.

When a sine wave signal is introduced at the input of a fraction of dispersive medium having a negative group velocity which is constant within a wide interval there no longer appears any front (the velocity of which is negative) but only a precursory signal having an extremely low amplitude in the case of a short signal, the said amplitude progressively increasing with the duration of the waveform until a permanent state is established. Such a medium therefore rejects the said signal and accepts only signals having a certain duration.

In other words, when a short signal (as defined above) passes into a system which has a negative group velocity $v_g$, the response of the system is spread over a period of time which is very great as compared with the duration of the short signal; taking account of the dissipation, it may be said that the signal is rejected.

According to the invention, the separation of useful, short signals from continuous or periodical jamming signals is obtained by rejecting the short signals by means of a device which accepts only the signals having a certain duration. Such a device is conveniently formed of a waveguide having a negative group velocity in a wide wavelength interval, of the order of one octave.

A device according to the invention comprises, on one hand, at least one waveguide having a negative group velocity and, on the other hand, a directional coupler comprising an input for the signals which are to be separated from one another, an output for short signals and at least one branch junction coupled to the said waveguide, the loss in said coupling between the said input and said output being substantially infinite.

According to a preferred embodiment of the invention, the directional coupler is a magic T, the two lateral branches of which are each coupled with a waveguide comprising an inner sleeve provided on its outer surface with a first series of equally spaced annular plates and arranged within an outer cylindrical hollow conductor provided on its inner surface with a second series of equally spaced annular plates, each plate of one series being inserted at equal distances between two successive plates of the other series and the radial dimension of a plate in each series being smaller than the difference between the inner radius of said outer conductor and the outer radius of said inner sleeve.

An embodiment of the invention is more particularly described hereafter, by way of a non-limitative example, with reference to the appended drawings in which.

Figure 3:
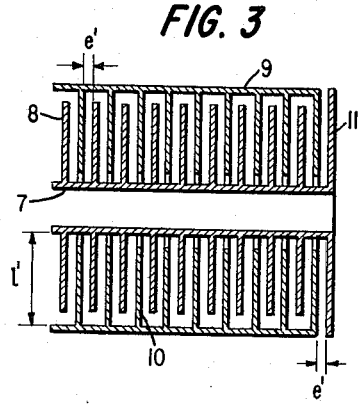
Figure 4:
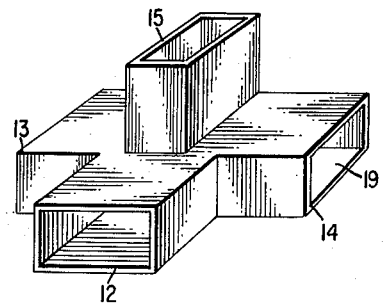
Figure 5:
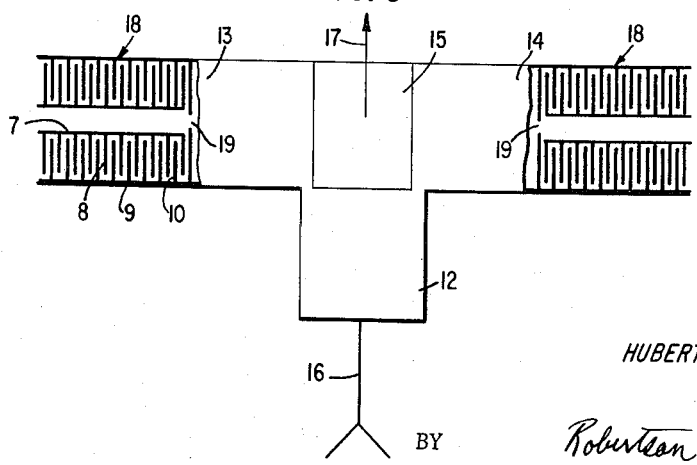

($c$ being the velocity of light, $3 \times 10^{10}$ cm./s. and $v_p$ the phase velocity) in ordinates; similarly, the group relay rate $$m_g = \frac{c}{v_g}$$

where $v_g$ is the group velocity;

FIG. 3 is a diagrammatic, longitudinal, sectional view of a practical embodiment of a waveguide adapted to be used according to the invention;

FIG. 4 is a perspective view of a magic T of known type;

FIG. 5 is a diagrammatic view of a complete device according to the invention, comprising the magic T shown in FIG. 4 and two waveguides of the type shown in FIG. 3.

In order to separate a jammed signal received by a radar receiver into its two components, viz. the radar signal proper formed of a very short sine wave signal and the continuous or periodical jamming or interfering signal, generated for instance by a carcinotron capable of covering a frequency band of one octave with a modulation frequency which may reach a plurality of megacycles per second, the device according to the invention comprises a waveguide the group velocity $v_g$ of which is negative over a wide interval, for instance of the order of one octave. Such a waveguide rejects the radar signals the duration of which is too short to produce a precursory signal of noticeable value.

Figure 1:
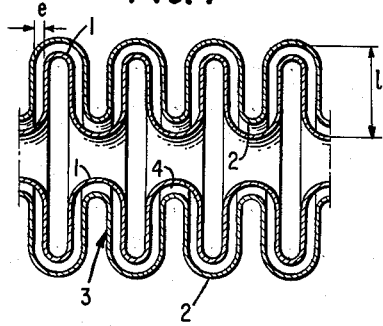
FIG. 1 is a diagrammatic, longitudinal, sectional view of a theoretical waveguide having a negative group velocity which is constant over an interval of one octave.
Figure 2:
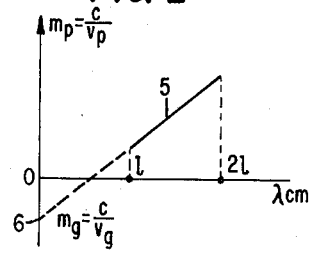
FIG. 2 is a curve showing the spreading in the waveguide of FIG. 1, the wave length $\lambda$ cm. being plotted in abscissae and the phase delay rate $$m_p = \frac{c}{v_p}$$

Theoretically, such a waveguide may be formed as shown at FIG. 1 by two accordion corrugated, cylindrical, indefinite metallic foils 1 and 2 the longitudinal section of which forms equal "digits" 3 of length $l$, having rounded ends 4, the distance $e$ between the two said foils being small with respect to the wave-length $\lambda$ of the signal. For instance, $\lambda$ may be five to ten times $e$. The calculation of the group velocity, based on the general theory of waveguides and on the propagation of waves in periodical media shows that the said speed in the waveguide of FIG. 1 is negative and remains constant within an interval of one octave, viz. that for which the wave length is comprised between one and two times the length $l$ of a "digit." Consequently, in the said octave, the spreading curve of the said waveguide (FIG. 2), which represents the variation of the phase delay rate plotted against the wave length:

$$m_p = \frac{c}{v_p} = f(\lambda)$$

(where $m_p$ is the phase delay rate, $c$ is the velocity of light, $v_p$ is the phase velocity, $f$ is "the function of" and $\lambda$ is the wave length) is a straight line 5 intersecting the ordinates axis at a point 6 which is below the abscissae axis, the ordinate of the said point 6 being equal to the group delay rate:

$$m_g = \frac{c}{v_g}$$

where $m_g$ is the group delay rate, $c$ is the velocity of light and $v_g$ is the group velocity.

In the practical embodiment of a waveguide having a negative group delay, acount should be taken of the necessity of coupling the said guide with a conventional cylindrical waveguide. It is for instance possible to use a cylindrical waveguide such as that shown at FIG. 3. The said waveguide comprises an inner sleeve 7 provided on its outer surface with equally spaced annular plates 8 and arranged coaxially in an outer cylindrical conductor 9 provided on its inner surface with equally spaced annular plates 10, each plate being inserted at equal distance between two successive plates 8. The radial dimension of plates 8 and 10 is smaller than the difference $l'$ between the inner radius conductor 9 and the outer radius sleeve 7.

Sleeve 7 and plates 8 play the part of foil 1 of the waveguide of FIG. 1 whereas conductor 9 and plates 10 play the part of sheet 2.

The matching of the waveguide shown at FIG. 3 at the end thereof is very simple due to the fact that the wave patterns in said guide are the T.E.M. type. It is therefore sufficient to place a disk shaped member 11 against the end of sleeve 7, the distance $e'$ between said disk and the adjacent plate 10 being equal to the distance between two adjacent plates 8 and 10. The said distance $e'$ is equivalent to distance $e$ in the waveguide of FIG. 1 and should consequently be small with respect to the wave length of the signal. Similarly, the distance $l'$ is equivalent to length $l$ in FIG. 1.

As an example, if the wave length $\lambda$ of the signal is comprised between 5 and 10 cm. the following dimensions may be given to the various members in the waveguide of FIG. 3.

| | |
|---|---|
| Outer diameter of sleeve 7 | 3 cm. |
| Inner diameter of conductor 9 | 13 cm. |
| Thickness of plates 8 and 10 | 0.1 cm. |
| Distance between two adjacent plates 8 or 10 in each series | 0.5 cm. |
| Outer diameter of plates 8 | 12.6 cm. |
| Inner diameter of plates 10 | 3.4 cm. |

$l' = 5$ cm.  
$e' = 0.15$ cm.

In such a waveguide the phase velocity varies between $\frac{c}{16}$ (for $\lambda = 5$ cm.) and $\frac{c}{46}$ (for $\lambda = 10$ cm).

and the group velocity is therefore negative.

The waveguide of the type shown at FIG. 5 may therefore be used to reflect a short sine wave signal, such as a radar signal. The bulk of the HF signal arriving at a radar receiver from the receiving aerial may be introduced in such guides by means of a magic T directional coupler of known type, shown at FIG. 4. Such a magic T coupler comprises four sections of rectangular guides 12, 13, 14 and 15 and has the following properties:

(1) The electric field introduced at 12 divides between sections 13 and 14, producing fields of equal amplitudes and phases but it incites no propagation in section 15.

(2) Any field introduced at 15 divides between sections 13 and 14, producing two equal fields of opposite phases but incites no propagation in section 12.

In other words, the loss is infinite between 12 and 15, the guide forming the arms of the T coupler operating with $TE_{01}$ pattern and the electric field being transverse to the longer side of the guide cross-section.

In the device shown in FIG. 5, the arm 12 of the T coupler is coupled with aerial 16 and branch 15 with the receiving set (arrow 17) whereas each branch 13 and 14 is coupled with a guide 18 of the type shown at FIG. 3, the coupling openings 19 coinciding with the position corresponding to the nodal points of the electric field in order that the maximum energy enters guides 18.

A wave received on aerial 16 and transmitted along the branch 12 cannot pass directly into the receiver branch 15, since the transmission loss between branches 12 and 15 is substantially infinite, as previously explained.

The wave arriving from branch 12 therefore divides and passes into the sections 13 and 14, in which the short signals (as hereinbefore defined) are reflected or rejected by the two delay lines 18 from which they pass back into the receiver branch 15, the impedance between branches 13 and 15 and branches 14 and 15 being low. The jamming signals of longer duration are accepted and transmitted through the delay lines 18 and are thus separated from the desired signals.

The device of FIG. 5 operates as follows:

The signals received by aerial 16 divide in branches 13 and 14 and pass through openings 19 in guides 18. The continuous or periodic jamming signals are transmitted through guides 18 to the outputs thereof whereas the useful very short radar signals cannot enter guides 18 and are reflected in the magic T coupler wherefrom said short signals pass out through branch 15 to be directed towards the receiving chain set (arrow 17). The receiving set is the conventional one for a radar receiver and comprises a local oscillator, a mixing stage receiving the input signal and the local oscillations, an intermediate frequency amplifier and a video unit.

What I claim is:

1. A device for separating short signals of given wavelength from a jamming signal, the duration of each of said short signals being short compared to the duration of the jamming signal, comprising a magic T coupler having an input branch adapted to receive the combination of said short signals and said jamming signal, an output branch for said short signals only, and two lateral branches, and two waveguides respectively coupled with said two lateral branches, each of said waveguides comprising an inner sleeve having an outer cylindrical surface provided with a first series of equally spaced parallel radially extending annular plates, said sleeve and said annular plates thereof being arranged coaxially within an outer cylindrical hollow conductor having an inner surface provided with a second series of equally spaced parallel radially extending annular plates, each plate of one series being inserted at equal distances between two successive plates of the other series and the radial dimension of a plate in each series being smaller than the difference between the inner radius of said outer conductor and the outer radius of said inner sleeve, whereby said waveguides are adapted to accept said jamming signals only and to reflect said short signals only to said output branch.

2. A device as claimed in claim 1, in which the distance between consecutive plates of two different series is small as compared with the wavelength of the signals which are to be detected.

3. A device for separating short signals of given wave length from a jamming signal, the duration of each of said short signals being short compared to the duration of said jamming signals, comprising a magic T coupler having an input branch adapted to receive the combination of said short signals and said jamming signal, an output branch for said short signals only, two lateral branches, and two waveguides respectively coupled with said two lateral branches, each of said waveguides comprising an inner sleeve having an outer cylindrical surface provided with a first series of equally spaced parallel radially extending annular plates, said sleeve and said annular plates thereof being arranged coaxially within an outer cylindrical hollow conductor having an inner surface provided with a second series of equally spaced parallel radially extending annular plates, each plate of one series being inserted between two adjacent plates of the other series, the distance between said plate of one series and the two said adjacent plates of the other series being small as compared with said given wavelength of said short signals, and the radial dimension of an annular plate in each series being smaller than the difference between the inner radius of said outer conductor and said inner sleeve, said distance being comprised between one-fifth and one-twentieth of said given wavelength of said short signals, whereby said waveguides are adapted to accept said jamming signals only and to reflect said short signals only to said output branch.

4. A device for separating short signals of given wavelength from a jamming signal, the duration of each of said short signals being short compared to the duration of said jamming signal, comprising a magic T coupler having an input branch adapted to receive the combination of said short signals and said jamming signal, an output branch for said short signals only, two lateral branches, and two waveguides respectively coupled with said two lateral branches, each of said waveguides comprising an inner sleeve having an outer cylindrical surface provided with a first series of equally spaced parallel radially extending annular plates, said sleeve and said annular plates thereof being arranged coaxially within an outer cylindrical hollow conductor having an inner surface provided with a second series of equally spaced parallel radially extending annular plates, each plate of one series being inserted between two adjacent plates of the other series, the distance between said plate of one series and the two said adjacent plates of the other series being small as compared with said given wavelength of said short signals, and the radial dimension of an annular plate in each series being smaller than the difference between the inner radius of said outer conductor and said inner sleeve, said distance being comprised between one-fifth and one-twentieth of said given wavelength of said short signals, a disk shaped end member on each of said waveguides, arranged at a distance of the adjacent annular plate equal to the distance between an annular plate of one series and an adjacent annular plate of the other series, said disk shaped member being located at an electric field nodal point in the lateral branch of said T coupler coupled with said waveguide, whereby said waveguides are adapted to accept said jamming signals only and to reflect said short signals only to said output branch.

5. In a radar receiver unit including a receiving aerial and a receiving set, a device for separating radar signals from a jamming signal, the duration of each of said radar signals being short compared to the duration of said jamming signal comprising a directional coupler having an input branch coupled with said aerial, an output branch coupled with said receiving set, and at least one other output branch coupled with a waveguide having negative group velocity and adapted to accept the jamming signals only and to reflect the short radar signals, said directional coupler having a substantially infinite loss for the direct path between the said input and first output branches, whereby said waveguide reflects said radar signals only to said output branch.

6. In a radar receiver unit including a receiving aerial and a receiving set, a device for separating radar signals from a jamming signal, the duration of said radar signals being short compared to the duration of said jamming signal comprising a magic T coupler having an input branch coupled with said aerial, an output branch coupled with said receiver set, and two lateral branches each coupled with a waveguide comprising an inner sleeve having an outer cylindrical surface provided with a first series of equally spaced parallel radially extending annular plates, said sleeve and said annular plates thereof being arranged coaxially within an outer cylindrical, hollow conductor having an inner surface provided with a second series of equally parallel radially extending annular plates, each plate of one series being inserted between two adjacent plates of the other series, the distance between said plate of one series and the two said adjacent plates of the other series being small as compared with said given wavelength of said short signals, and the radial dimension of an annular plate in each series being smaller than the difference between the inner radius of said outer conductor and said inner sleeve, said distance being comprised between one-fifth and one-twentieth of said given wavelength of said short signals, whereby each of said waveguides is adapted to accept said jamming signals only and to reflect said radar signals to said output branch coupled to said receiver set.

7. A device for separating short signals having a given frequency spectrum and a duration less than that of an impulse of central frequency of the said spectrum, which impulse has a duration substantially equal to the period of said central frequency, from jamming signals having a duration greater than that of said impulse, comprising at least one delay line having a de-phasing law such that the group propagation time of said line is negative about said central frequency, and constituted by at least one waveguide adapted to accept the jamming signals only and to reflect said short signals, and a magic T coupler having an input branch adapted to receive the combination of said short signals and said jamming signals, said magic T coupler having a first output branch for said short signals and having at least one other output branch coupled with said waveguide, said coupler having substantially infinite loss for the direct path between the said input and first output branches.

References Cited in the file of this patent

UNITED STATES PATENTS

| 2,097,880 | Hermanspann | Nov. 2, 1937 |
| 2,467,308 | Hansell | Apr. 12, 1949 |
| 2,593,113 | Cutler | Apr. 15, 1952 |
| 2,795,763 | Tillotson | June 11, 1957 |